United States Patent

Benson

[15] 3,660,036
[45] May 2, 1972

[54] ANALYTICAL METHOD AND APPARATUS

[72] Inventor: Royal H. Benson, Texas City, Tex.

[73] Assignee: Monsanto Company, St. Louis, Mo.

[22] Filed: Dec. 22, 1969

[21] Appl. No.: 886,953

[52] U.S. Cl................23/230 R, 23/232 R, 23/253 R, 23/254 R, 250/106 R, 23/232 C, 250/106 T
[51] Int. Cl....................G01n 23/12, G21h 5/00
[58] Field of Search...........23/230, 232, 253, 254; 176/10, 176/19, 19 L; 252/301.1; 73/231; 250/43.5, 44, 106 T

[56] References Cited

UNITED STATES PATENTS 3,560,158   2/1971   Benson................23/230 R

OTHER PUBLICATIONS

Benson, Analytical Chemistry, Vol. 38 pp. 1353–1356 (Sept. 1966)

Primary Examiner—Morris O. Wolk
Assistant Examiner—Elliott A. Katz
Attorney—M. N. Cheairs, Elizabeth F. Sporar and Neal E. Willis

[57] ABSTRACT

An improvement in a method for analyzing labile-hydrogen-containing compounds present in mixtures wherein the mixture is passed over a labile-tritium-containing substrate to effect exchange of the labile hydrogen with the labile tritium and the resulting tritium-containing compound is detected and measured, the radioactivity measurement being used to determine the amount of the labile-hydrogen-containing compound in the mixture, which comprises passing the effluent from the detecting means through a high capacity "tritium trap" containing a substance having labile-hydrogen atoms to prevent the venting of dangerous amounts of radioactive tritium-containing compounds into the atmosphere. The invention also provides the combination of a suitable "tritium trap" with an analytical system for carrying out the above method comprised of a column connected to the outlet of the detecting means and which contains a substance having labile-hydrogen atoms.

19 Claims, 3 Drawing Figures

Royal H. Benson
INVENTOR

BY *M. N. Chow*

ATTORNEY 3,660,036

ANALYTICAL METHOD AND APPARATUS

BACKGROUND OF THE INVENTION

The present invention relates to an analytical method and apparatus. More particularly, the present invention relates to an improvement in an analytical method and apparatus wherein very small amounts of certain components of mixtures may be accurately detected and measured.

In copending application, Ser. No. 479,109, now U.S. Pat. No. 3,560,158 filed Aug. 12, 1965, there is described a technique for the detection and measurement of quantities of materials well beyond the lower limits of present chromatographic methods. In the method described in the above-identified application, a sample containing a compound having a labile-hydrogen atom is passed via a carrier gas as a driving force through a column packed with a material which contains labile-tritium atoms. As the sample passes through the column, the labile-hydrogen atoms in the sample exchange with the labile-tritium atoms in the packed column such that on exiting from the column, the labile-hydrogen-containing compound initially present in the sample has been converted to a labile-tritium-containing compound, and thus is radioactive. The effluent from the packed column containing the labile-tritium compound(s) is sent to a suitable radioactive detector which detects the radiation from the tritium in the compounds. The amount of radiation detected is then related to the amount of the labile-hydrogen-containing compound that was originally present in the sample mixture. In a sample mixture containing a plurality of components, the mixture is usually separated into its various individual components by means of commonly known gas chromatographic columns. The separated components are then passed to the packed column containing the labile-tritium substrate and any of the components which happen to contain labile-hydrogen atoms then undergo exchange as described above.

The method described in the above-identified application is also useful in the identification of components in samples, which although contain no labile hydrogen themselves, are convertible to compounds containing such. In this instance, the component is first subjected to a suitable conversion means such as a combustion technique using oxygen as the oxidant whereby the components are converted to compounds containing labile-hydrogen atoms. The thus converted compound is then passed to the packed column containing the labile-tritium substrate as explained above. As above, the sample mixture can first be separated into individual components by suitable chromatographic techniques. Although the above-described methods provide extremely valuable and accurate techniques for the detection and measurement of extremely small amounts of components, they present, by virtue of the fact that they utilize radioactive materials, certain potential safety hazards. Since usually the amount of the labile-hydrogen-containing compound or compound convertible thereto whose detection and measurement is sought, is present in extremely small amounts in the sample mixture, the amount of labile-tritium-containing compound leaving the analytical system is negligible in terms of presenting a radiation hazard to health. However, should the operator of the system accidentally inject a sample containing extremely large quantities of a labile-hydrogen-containing compound or compound convertible thereto, the effluent from the detector released to atmosphere would contain an amount of tritium-containing compound which could potentially pose a hazard to health.

SUMMARY OF THE INVENTION

It is therefore an object of the present invention to provide an improved analytical method.

Another object of the present invention is to provide an improvement in an analytical method employing radioactive substances which renders the technique free from safety hazards caused by operator error.

Still another object of the present invention is to provide an improvement in a system used for the detection and measurement of extremely small amounts of materials and employing radioactive materials which renders the system substantially free from radiation hazards due to operator error.

Additional objects will become apparent from the description given herein, the attached drawings and the appended claims.

The improvement in the above-described methods which overcomes the problem of possible operator error and which is provided by this invention comprises contacting the effluent from the detection system with a substance having labile-hydrogen atoms, the substance being present in such an amount that substantially all of the tritium present in the compound exchanges with the hydrogen present in the substance. The improvement described above is applicable to cases in which the sample being measured contains a labile-hydrogen-containing compound or to cases where the sample contains no labile-hydrogen-containing compound but does contain compounds which are convertible thereto.

The present invention also provides an improvement in an analytical system for carrying out the above-described method which comprises a suitable housing containing a substance having labile-hydrogen atoms, said housing having an inlet and an outlet, the inlet of said housing being connected to the outlet of said detection means whereby the effluent from the detection means passes through the housing.

DESCRIPTION OF THE PREFERRED EMBODIMENTS

Figure 1:
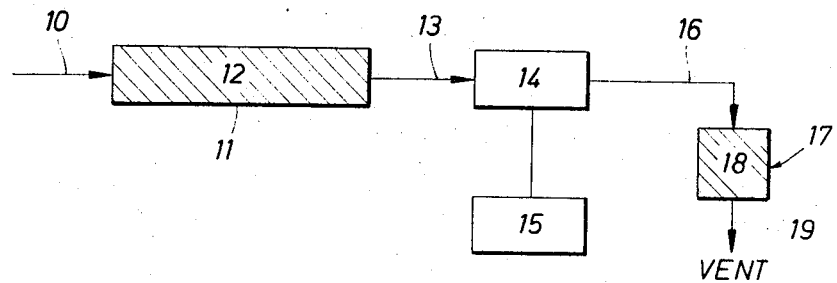
FIGS. 1, 2 and 3 represent schematic flow diagrams of different embodiments of the present invention.

Referring first to FIG. 1, a sample mixture containing at least one compound having a labile-hydrogen atom is passed either in the liquid or gaseous phase, though preferably in the gaseous phase, by means of line 10 into exchange column 11 which is packed with a fixed phase 12, hereinafter referred to as a substrate. This substrate 12 is one containing exchangeable tritium. As the sample mixture passes through column 11 and over substrate 12, the compounds in the mixture which contain labile hydrogen exchange their labile hydrogen for the tritium of substrate 12 until an exchange equilibrium is reached. The mixture now containing tritium-containing compounds passes from column 11 by means of line 13 and through radioactivity detector 14 by means of which the radioactivity of the tritium in the mixture is measured. The type of radioactivity detectors useful in the present invention are hereinafter discussed. By measuring the radioactivity of the mixture, the amount of tritium, which has a known amount of radioactivity per unit of weight, can be determined. By determining the amount of tritium passing from column 11, the concentration of the tritium-containing compounds, which initially were the compounds containing labile hydrogen, can be obtained. In practical usage, the radioactivity response of detector 14 will most often be transmitted to a recorder 15 where it is continuously recorded in a desired form. The tritium-containing components pass from radioactivity detector 14 by means of line 16 into column 17 which is a "tritium trap," containing a substance 18 which has labile-hydrogen atoms. Upon passing through column 17, the labile tritium present in the effluent emerging from detector 14 exchanges with the labile hydrogens present in the substance in column 17 such that the effluent emerging from column 17 contains negligible quantities of tritium so far as posing a health hazard is concerned. Should a sample containing a large concentration of a labile-hydrogen-containing compound be accidentally injected into the system through 10, it is seen that the presence of column 17 containing substance 18 will reduce the radioactivity of the effluent to a safe level and thus the effluent ultimately vented via line 19 will be harmless. The embodiment of the analytical method depicted in FIG. 1 is particularly useful wherein the analysis is either for the total concentration of labile-hydrogen-containing compounds in the mixture or for the detection and determination of the amount of a labile-hydrogen-containing compound in a mixture when only one of such compounds is present. If two or more labile-hydrogen-containing compounds are present in the mixture and it is desired to detect and measure the amounts of each of these separately, the analytical technique described in relation to FIG. 2 is most often used.

Figure 2:
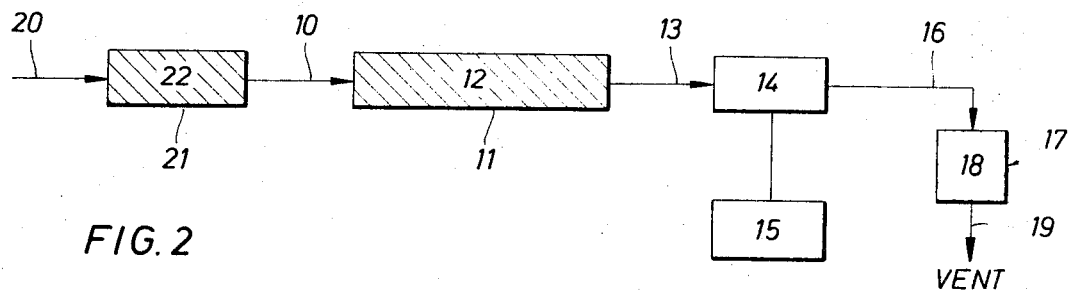

With particular reference to FIG. 2, a mixture containing two or more different compounds having labile-hydrogen atoms is resolved into its components by introducing the mixture via line 20 into a separating column 21 in which means 22 are provided for separating the mixture into its components. Each component having a labile-hydrogen atom then passes separately from any other compound having labile-hydrogen atoms from separating column 21 by means of line 10 into exchange column 11 wherein the labile-hydrogen atoms are exchanged for tritium and the radioactivity of the resulting tritium-containing components subsequently detected and measured as described above in reference to FIG. 1. Column 17, of course, performs the same function as described above in the embodiment of FIG. 1, preventing release of dangerous quantities of a tritium-labiled material to atmosphere.

Again, referring to FIG. 2, the means 22 provided in separating column 21 for resolving the mixture into its components include any means whereby the mixture may be separated into its components or at least the compounds containing labile-hydrogen atoms may be separated one from another. Such separation methods as selective adsorption, selective absorption or other combinations of these are usually favored, though other techniques such as fractionation, diffusion through permeable membranes and the like may be used. The mixture may be separated in the vapor or liquid state. As a practical matter, the separation means most often takes the form of a conventional chromatographic column operated according to conventional gas chromatographic techniques.

Figure 3:
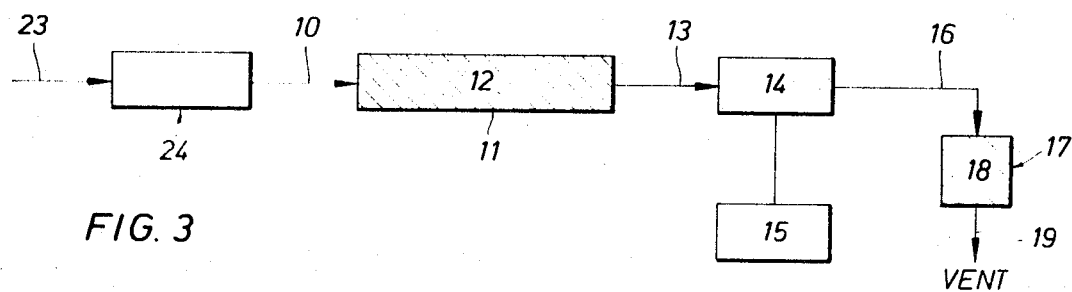

In FIG. 3, an analytical technique is presented which is particularly useful in the detection of compounds which do not contain labile-hydrogen atoms, but which may be converted by chemical or physical means to compounds which do contain labile-hydrogen atoms. In this embodiment, the mixture is passed by means of line 23 into a conversion chamber 24. This conversion chamber may be of any type which will cause conversion of certain components of the mixture to compounds having labile-hydrogen atoms, either by chemical or physical conversion means. The resulting conversion products exit conversion chamber 24 and pass by means of line 10 into exchange column 11 and over substrate 12 by means of which the labile-hydrogen atoms in the conversion products are exchanged for tritium and detected and measured as described above in reference to FIG. 1. As in the case of the techniques described with reference to FIGS. 1 and 2 above, column 17 serves the same function in the technique described in FIG. 3. If two or more compounds convertible to compounds having labile-hydrogen atoms are present in the mixture or if compounds having labile-hydrogen atoms and compounds convertible to compounds having labile-hydrogen atoms are both present in the initial mixture, and detection and measurement of each of these compounds is desired, it is usually necessary to first resolve the mixture into its components as described in reference to FIG. 2 and then pass the components through conversion chamber 24 individually.

The means by which compounds which do not contain labile-hydrogen atoms may be converted to other compounds which do contain labile or active hydrogen atoms may be any of the conventional conversion processes either chemical or physical, which will produce labile-hydrogen-containing compounds from these compounds. The simplest and most useful of these methods, particularly when the convertible compound is a hydrocarbon, hydrogen or oxygen, is combustion, which produces water as one of the combustion products. It is, of course, necessary for accurate determination that the combustion or conversion method be one which produces a quantitative conversion or at least a conversion of known and reproducible efficiency of the convertible compounds to compounds containing labile-hydrogen atoms.

The analytical method described above to which the improvement of the present invention applies is based upon the exchangeability of labile hydrogen of compounds with tritium which is a radioactive-hydrogen isotope of mass number 3. When a labile-tritium-containing substrate comes in contact with compounds containing labile-hydrogen atoms, there is a rapid exchange of the labile-hydrogen atoms with tritium atoms until an exchange equilibrium is reached. The radioactivity of the tritium is readily measurable while that of the labile hydrogen is not. The beta radiation of the tritium compounds may be measured by conventional means for measuring radioactivity, such as Geiger counters, proportional counters, scintillation counters, ion collection chambers, and the like. Preferably, for greater sensitivity, the radioactivity of the tritium compounds is measured by means of scintillation counters or ion collection chambers, usually the latter means being preferred over the former.

As can be seen from above, the improvement set forth by the present invention renders the analytical method to which it is applied safe and almost totally free from operator error. As explained, in most cases the sample mixtures being analyzed will contain very minute amounts of labile-hydrogen-containing compound. In fact, the analytical method to which the improvement of the present invention applies is primarily aimed at the analysis of trace quantities of labile-hydrogen-containing impurities in various sample mixtures. However, should a sample be injected into the system which contains large quantities, i.e., >75 parts per million, of a compound having labile-hydrogen atoms, the method and apparatus of the present invention will prevent the release to the atmosphere of a large quantity of tritium-containing material.

The contacting of the effluent from the detection means called for by the present invention can be carried out in several different ways. One method of contacting is simply to vent the effluent from the detection means into a container containing the substance having labile-hydrogen atoms. A more preferred method of contacting is to prepare a column, preferably out of a suitable tubular member, which has a bed of the substance containing labile-hydrogen atoms, connect one end of the column to the outlet of the detection means and allow the effluent from the detection means to percolate through the column. This latter method of contacting insures maximum contact and therefore maximum exchange of the labile tritium in the compound with the labile hydrogen in the substance.

Practically any substance which contains any labile or exchangeable hydrogen atoms can be employed in the "tritium trap." It is preferred however, that the substance chosen for use in the tritium trap contain greater than 0.1 percent by weight of labile-hydrogen atoms. Obviously the greater the concentration of labile-hydrogen atoms in the substance, the less substance must be used in the "tritium trap."

The substance containing the labile-hydrogen atoms can be either a liquid or a solid. One disadvantage in using a liquid, is that the effluent from the detecting means must generally be scrubbed through the liquid. This can result in excessive back pressure to the carrier gas flow and cause tailing or other undesirable effects on the analytical method. Nonetheless, if desired, a liquid may be employed as the substance in the "tritium trap." Obviously, any number of liquids qualify for use. Suitable examples include alcohols, acids, amines, water, and any other of the well known labile-hydrogen-containing liquids.

For all around ease of operation, and convenience, it is preferable that the substance containing the labile-hydrogen atoms be a solid and especially a particulate or fibrous solid. The use of such solids makes it relatively easy to prepare a packed column which offers minimum resistance to carrier gas flow and thus minimizes any back pressure effects. The term particulated as used herein, refers to solid pieces having an average-size ranging from 300 mesh up to chunks having an average diameter of one-half inch. The shape of the solid particles is not critical. When a solid is employed as the substance in the tritium trap, it can be any one of numerous solid substances containing hydroxyl groups, amine groups, amide groups, or the like. Examples include alumina, silica, silica gel, clays such as kaolin, diatomaceous earth, molecular sieves, hydrated salts such as hydrated calcium sulfate, hydrated calcium chloride, polymeric aromatic amines, polymeric aromatic amides, and numerous other solid materials having like characteristics. In general, any solid material containing labile-hydrogen atoms is a suitable substance for use in the tritium trap of the present invention.

Preferably, the amount of the substance in the "tritium trap" should be 10 times or greater the amount by weight of the labile-tritium-containing compound in the effluent from the detector. Smaller amounts can be employed if desired, however, with no sacrifice of safety.

The operating conditions employed in applying the present invention may vary over a relatively wide range. Preferably the temperature of the "tritium trap" is maintained at or near ambient to minimize the possibility of "stripping off" labile-hydrogen atoms as water, etc. However, higher temperatures can be employed if desired, the kinetics of the exchange being favored by higher temperatures. Pressures may range from sub-atmospheric to as high as 100 psig., and higher. The residence time of the effluent in the column containing the substance having labile-hydrogen atoms, i.e., the "trap," may be very short without reducing the safety factor. For example, residence times of as low as 0.01 seconds will be sufficient to achieve greater than 99 percent exchange of the tritium for the labile hydrogen.

The use of the present invention will prevent the immediate escape of harmful quantities of tritium to atmosphere. Once it has been determined that an excessive amount of a labile-hydrogen-containing compound was present in the initial sample mixture, and that the "tritium trap" now contains a potentially hazardous amount of tritium, the tritium trap is removed and the tritium therein disposed of in a suitable manner. This procedure is necessitated by the fact that, although the tritium is initially trapped, it will eventually elute off of the column following well known principles of gas chromatography. This, however, presents no problem inasmuch as the operator will have been apprised of the fact that an excessive amount of labile-hydrogen-containing compound has been injected into the system initially because of the excessive recorder response due to the peak from the tritium-containing compound.

In the analytical method to which the present invention applies, the source of the tritium is generally a tritium-containing fixed phase or substrate with which the labile-hydrogen-containing compounds in the sample mixture are contacted. This tritium-containing substrate can be prepared by several well known methods. Generally the substrate material used for preparing the tritium-containing substrate are those having as substituents hydroxyl, amine, amide, or any other like group having labile-hydrogen atoms attached thereto. Suitable substrates include polymeric aromatic amines, polymeric aromatic amides, benzimidazole polymers and polybenzothiazoles.

The materials which may be detected and measured by the analytical method in which the present invention applies can be divided into two main classes; (1) those which contain compounds having labile-hydrogen atoms such as water, alcohols, amines, amides, acids and the like; and (2) those having compounds with no labile hydrogen but which may, by suitable conversion means, be converted to compounds having labile hydrogen. This latter class of compounds or elements includes hydrocarbons, oxygen, hydrogen, the halogens, carbon dioxide and many other compounds. In particular, hydrocarbons, oxygen and hydrogen are especially amenable to conversion to labile-hydrogen-containing compounds. For example, hydrocarbons may be quantitatively converted to water and $CO_2$ by combustion techniques and the water obtained by the combustion may then be detected and measured by the analytical technique.

The analytical technique to which the present invention applies is carried out with the mixture in a fluid state, and more preferably the entire operation is carried out in the gaseous state. In carrying out the technique in the gaseous state, the carrier gas used to sweep the sample mixture through the system can be any carrier gas normally employed in gas chromatography with the exception that the gas should not be one containing any labile-hydrogen atoms.

To illustrate the effectiveness of the present invention, the following example is presented.

EXAMPLE a 10 millimeter glass tube, three inches long, was filled with 10 grams of molecular sieve, type 13A. The thus prepared "tritium trap" was connected between the tritium exchange column and the detector. In other words, rather than the tube containing the molecular sieve which corresponds to column 17 of FIG. 1 being connected to the effluent from detector 14, column 17 was placed between column 12 and detector 14. A sample containing sufficient labile hydrogen to displace 1 microcurie of tritium from the exchange column was injected into the system through line 10. No tritium-containing materials emerged for a period of over 1 hour. This was evidenced by the fact that recorder 15 maintained a virtually constant base line for well over the 1-hour period.

As can readily be seen from the foregoing example, the present invention provides a method and means of preventing possible accidental release of tritium-containing materials into the atmosphere.

What is claimed is:

1. In an analytical method for the detection and measurement of labile-hydrogen-containing compounds wherein a sample mixture containing at least one compound having labile hydrogen is passed through a fixed phase of a labile-tritium-containing substrate such that the labile hydrogen in said compound exchanges with the labile tritium in said substrate and the resulting labile-tritium-containing compound is detected by suitable radioactivity detecting means, the improvement wherein excessive amounts of said labile-tritium-containing compound in the effluent from said detecting means are prevented from release to atmosphere comprising contacting said effluent with a substance having labile-hydrogen atoms, said substance being present in an amount sufficient to effect substantially complete exchange of the labile tritium in said tritium-containing compound with the hydrogen in said labile-hydrogen-containing substance.

2. The method of claim 1 wherein said contacting is carried out by passing said effluent through a column containing a bed of said substance.

3. The method of claim 1 wherein the amount of said substance is 10 times the amount by weight of said labile-tritium-containing compound in said effluent.

4. The method of claim 1 wherein said substance is a fibrous solid.

5. The method of claim 1 wherein said substance is a particulate solid.

6. The method of claim 1 wherein said substance contains greater than 0.1 percent by weight of labile-hydrogen atoms.

7. The method of claim 1 wherein said substance contains greater than 0.1 percent by weight of labile-hydrogen atoms.

8. In an analytical method for the detection and measurement of components convertible to labile-hydrogen-containing compounds wherein a sample mixture containing at least one component convertible to a labile-hydrogen-containing compound is subjected to a suitable conversion means, the resulting labile-hydrogen-containing compound is passed through a fixed phase of a labile-tritium-containing substrate such that the labile hydrogen in said labile-hydrogen-containing compound exchanges with the labile tritium of said substrate, and the resulting labile-tritium-containing compound is detected by suitable radioactivity detection means, the improvement wherein excessive amounts of said labile-tritium-containing compound in the effluent from said detecting means are prevented from release to atmosphere comprising contacting said effluent with a substance having labile-hydrogen atoms, said substance being present in an amount sufficient to effect substantially complete exchange of the labile tritium in said tritium-containing compound with the hydrogen in said labile-hydrogen-containing substance.

9. The method of claim 8 wherein said component convertible to said labile-hydrogen-containing compound is one selected from the group consisting of hydrocarbons, hydrogen and oxygen.

10. The method of claim 8 wherein said contacting is carried out by passing said effluent through a column containing a bed of said substance.

11. The method of claim 8 wherein the amount of said substance is 10 times the amount by weight of said labile-tritium-containing compound in said effluent.

12. The method of claim 8 wherein said substance is a fibrous solid.

13. The method of claim 8 wherein said substance is a particulate solid.

14. In a system for the analysis of samples containing compounds having labile-hydrogen atoms or components convertible thereto, comprising: an exchange column packed with a substrate containing labile-tritium atoms; means to introduce a sample into said system upstream from said exchange column; means to introduce a fluid carrier stream into said system, said carrier stream serving to transport said sample through said exchange column; means for withdrawing the sample and carrier fluid from said exchange column; and means for detecting and measuring the radioactivity of the resulting tritium-containing compounds, the combination of a housing having an inlet and an outlet, said housing containing a substance having labile-hydrogen atoms, and means connecting the inlet of said housing with the outlet of said detecting means whereby the effluent from said detecting means flows through said housing.

15. The combination of claim 14 having means connected between where said sample is introduced into said system and said exchange column said means being for converting components present in said sample into compounds having labile-hydrogen atoms.

16. The combination of claim 15 wherein the conversion means comprises a combustion apparatus.

17. The combination of claim 14 wherein said housing comprises a tubular member.

18. The combination of claim 17 wherein said substance contains greater than 0.1 percent by weight labile-hydrogen atoms.

19. The combination of claim 18 wherein said substance is a particulate solid.

* * * * *